(12) United States Patent
Xu et al.

(10) Patent No.: US 9,647,881 B2
(45) Date of Patent: May 9, 2017

(54) MANAGING A NETWORK CONNECTION OF A SWITCH

(71) Applicant: LENOVO ENTERPRISE SOLUTIONS (SINGAPORE) PTE. LTD., New Tech Park (SG)

(72) Inventors: Qiao Rong Xu, Wuxi (CN); Fan Yang, Wuxi (CN)

(73) Assignee: LENOVO ENTERPRISE SOLUTIONS (SINGAPORE) PTE. LTD., Singapore (SG)

(*) Notice: Subject to any disclaimer, the term of this patent is extended or adjusted under 35 U.S.C. 154(b) by 139 days.

(21) Appl. No.: 14/526,714

(22) Filed: Oct. 29, 2014

(65) Prior Publication Data

US 2015/0117182 A1 Apr. 30, 2015

(30) Foreign Application Priority Data

Oct. 30, 2013 (CN) .......................... 2013 1 0524462

(51) Int. Cl.
*H04L 12/24* (2006.01)
*H04L 12/46* (2006.01)

(52) U.S. Cl.
CPC ...... *H04L 41/0672* (2013.01); *H04L 12/4641* (2013.01); *H04L 41/0806* (2013.01); *H04L 41/0816* (2013.01)

(58) Field of Classification Search
None
See application file for complete search history.

(56) References Cited

U.S. PATENT DOCUMENTS

| | | | |
|---|---|---|---|
| 7,848,226 B2 | 12/2010 | Morita | |
| 8,320,293 B2 | 11/2012 | Zheng et al. | |
| 8,358,591 B2 | 1/2013 | Chuang et al. | |
| 8,400,912 B2 | 3/2013 | Busch et al. | |
| 2005/0102557 A1* | 5/2005 | Davies | G06F 11/2005 714/11 |

(Continued)

FOREIGN PATENT DOCUMENTS

| | | |
|---|---|---|
| EP | 1741239 B1 | 4/2013 |
| WO | WO2013020126 A1 | 2/2013 |
| WO | WO2013059440 A1 | 4/2013 |

OTHER PUBLICATIONS

Wang, Meiji, et al., "Data Center Network Connectivity with IBM Servers," Juniper Networks, Jun. 2010, 160 pages.

*Primary Examiner* — Charles C Jiang
*Assistant Examiner* — George Atkins, Jr.
(74) *Attorney, Agent, or Firm* — Kunzler Law Group (57) ABSTRACT

Managing a network connection of a switch. Software configuration information relating to the network connection of the switch is obtained, wherein the information specifies at least one VLAN connecting to the switch and a plurality of uplinks to be shared. According to the software configuration information, the plurality of uplinks is assigned to the at least one VLAN to form a corresponding connection relationship, in which relationship, each VLAN corresponds uniquely to one uplink from the plurality of uplinks. The hardware connection between the at least one VLAN and the plurality of uplinks on the hardware layer of the switch is set according to the corresponding connection relationship. Shared links may be formed in the switch, which links have multiple uplinks with redundancy, all in active status.

18 Claims, 4 Drawing Sheets

(56) References Cited

U.S. PATENT DOCUMENTS

| | | | |
|---|---|---|---|
| 2007/0283186 A1* | 12/2007 | Madnani | G06F 3/0617 |
| | | | 714/6.2 |
| 2009/0235272 A1* | 9/2009 | Nakano | G06F 1/3287 |
| | | | 718/105 |
| 2010/0054260 A1* | 3/2010 | Pandey | H04L 49/00 |
| | | | 370/395.53 |
| 2013/0039170 A1 | 2/2013 | Higgins | |
| 2013/0117766 A1* | 5/2013 | Bax | G06F 9/4405 |
| | | | 719/323 |
| 2013/0243006 A1* | 9/2013 | Otsuka | H04L 12/4604 |
| | | | 370/401 |

\* cited by examiner

MANAGING A NETWORK CONNECTION OF A SWITCH

PRIOR FOREIGN APPLICATION

This application claims priority from Chinese patent application number 201310524462.9, filed Oct. 30, 2013, which is hereby incorporated herein by reference in its entirety.

BACKGROUND

One or more aspects of the present invention relate to network management, and in particular, to managing a network connection of a switch.

The explosive growth of all kinds of information in the networked electronic commerce brings a great challenge to a data center providing services. Accordingly, the data center sees an ever-increasing size and a more complex network. In order to allow the data center network to be easily managed, maintained and even extended, host-mode connectivity is gradually becoming one of the dominant data center network solutions. In this mode, the data center network presents itself to users as an end host system to remove network complexity.

Figure 1:
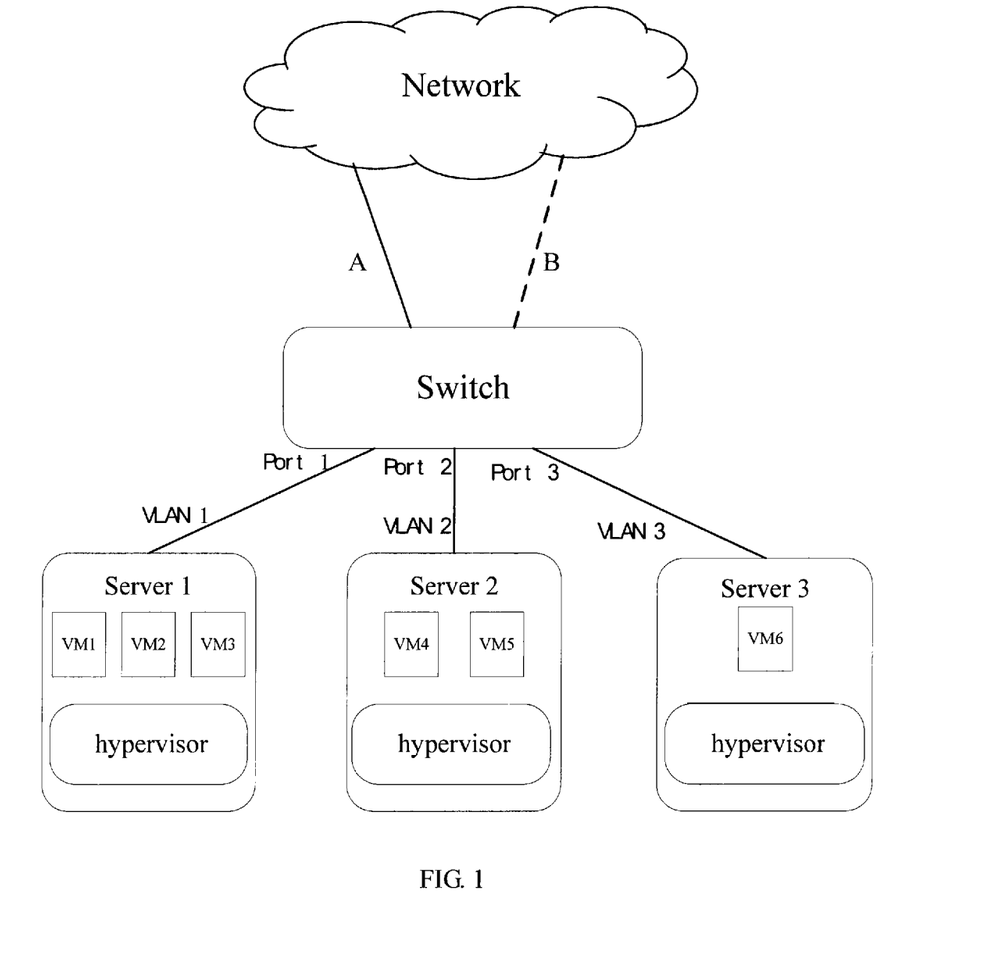
FIG. 1 shows a structure chart of a typical data center network.

FIG. 1 shows a structure chart of a typical data center network. FIG. 1 shows three physical platforms comprised in the data center network, such as, for example, servers 1, 2, 3. At the lowest level of each physical platform, a virtual machine hypervisor runs; based on the hypervisor, one or more virtual machines may be installed as needed. These virtual machines, like factual and independent end hosts, run in parallel, independently and separately from each other, providing applications and services. Naturally, a physical platform may be served as an end host directly. In a typical network connection structure, the end hosts, including virtual machines, are connected to an (Ethernet) switch, and further to the upstream network via the switch. In particular, the switch has some terminal ports on one side, such as ports 1, 2, 3 shown in FIG. 1, for connecting the end hosts; on the other side, it has link ports for uplinks, such as ports A and B, and data from end hosts are transmitted via the uplinks to the upstream network, such as an upstream switch or upstream internet. Generally, according to a predetermined way, such as a host's MAC address, the switch divides the connected end hosts into Virtual Local Area Networks (VLAN), and manages the network connection of terminal devices by taking VLAN as a unit. In the example of FIG. 1, the virtual machines from three physical platforms are separately divided into three groups of VLAN, and accordingly connected to three terminal ports, and then connected to the upstream network via uplinks A, B.

In order to ensure the stability of the data center network, usually it is necessary to provide the network with redundancy, for example, by providing a standby and redundant uplink. According to the existing hot-link solution, the data center network is provided with redundant dual uplinks, in which one uplink is in active status or working status and the other uplink is in passive status or standby status. For example, the uplink A as shown in FIG. 1 may be set as active status, and the uplink B may be set as passive status. In the case of a failure in the uplink of active status, the other uplink, originally in standby status, will be enabled. In this solution, however, there is always one uplink which is in standby status, and thus it is a waste for the uplink resources.

On the other hand, in the case of enabling multiple uplinks, it is prone to form a loop in the switch. As known by those skilled in the art, in a switched network, when a switch receives a data frame with an unknown destination address, the switch will broadcast the data frame. Thus, in a switched network with physical loops, a two-way broadcast ring, or even a broadcast storm, will happen, resulting in downtime due to the depletion of the switch resources. Therefore, the Spanning Tree Protocol (STP) has been proposed to resolve the problem. However, the execution of STP still increases the complexity of the network.

In addition, in the prior art, other solutions have been proposed to provide dual uplinks in active status, such as the virtual Port Channel (vPC) solution, the virtual Link Aggregation Group (vLAG) solution, and the like. Among these solutions, however, the vPC solution and the vLAG solution require that the upstream network should be a counterpart network supporting vPC or vLAG, such that the user's existing network has to be modified. For all the above mentioned existing solutions, it is difficult to be implemented in the existing network structure.

SUMMARY

In view of the above questions in the prior art, one or more aspects of the present invention provide a solution, which provides uplinks with redundancy in multiple active status by managing the network connection of a switch. In one example, a data center switch is provided with uplinks with redundancy in active status based on the existing network structure.

According to one aspect, a method for managing a network connection of a switch, includes: obtaining software configuration information relating to a network connection of the switch, wherein the software configuration information specifies at least one virtual local area network VLAN connecting to the switch and a plurality of uplinks to be shared by the at least one VLAN; according to the software configuration information, assigning the plurality of uplinks to the at least one VLAN to form a corresponding connection relationship, in which relationship, each VLAN in the at least one VLAN corresponds uniquely to one uplink from the plurality of uplinks; and setting the hardware connection between the at least one VLAN and the plurality of uplinks on the hardware layer of the switch according to the corresponding connection relationship.

According to another aspect, an apparatus for managing a network connection of a switch includes: a software configuration information obtaining unit configured to obtain software configuration information relating to a network connection of the switch, wherein the software configuration information specifies at least one virtual local area network VLAN connecting to the switch and a plurality of uplinks to be shared by the at least one VLAN; a connection relationship forming unit configured to assign, according to the software configuration information, the plurality of uplinks to the at least one VLAN to form a corresponding connection relationship, in which relationship, each VLAN in the at least one VLAN corresponds uniquely to one uplink from the plurality of uplinks; and a hardware setting unit configured to set the hardware connection between the at least one VLAN and the plurality of uplinks on the hardware layer of the switch according to the corresponding connection relationship.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which embodiments of the present disclosure have been illustrated. However, aspects of the present disclosure can be implemented in various manners, and thus should not be construed to be limited to the embodiments disclosed herein. On the contrary, those embodiments are provided for the thorough and complete understanding of aspects of the present disclosure, and completely conveying the scope of aspects of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any applicable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any applicable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any applicable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any applicable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
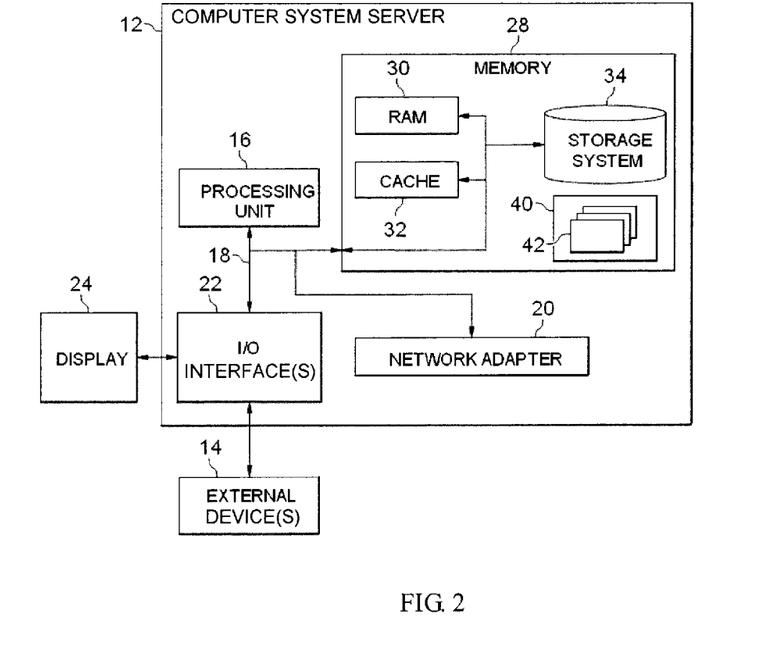
FIG. 2 is a block diagram showing an exemplary computer system/server 12 which is applicable to implement the embodiments of the present invention.

Referring now to FIG. 2, in which an exemplary computer system/server 12 which is applicable to implement embodiments of the present invention is shown. Computer system/server 12 is only illustrative and is not intended to suggest any limitation as to the scope of use or functionality of embodiments of the invention described herein.

As shown in FIG. 2, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Embodiments of the invention will now be described in conjunction with the drawings and detailed examples. In the examples of the invention, users are allowed to allocate a plurality of uplink ports to a single VLAN on the software configuration layer of the switch, while on the hardware layer, only one uplink port is selected for each VLAN, thus forming shared links when avoiding physical loops, and thereby providing uplink connection which is simple and has redundancy and high availability. An implementation of the above concept will be described below in conjunction with the drawings.

Figure 3:
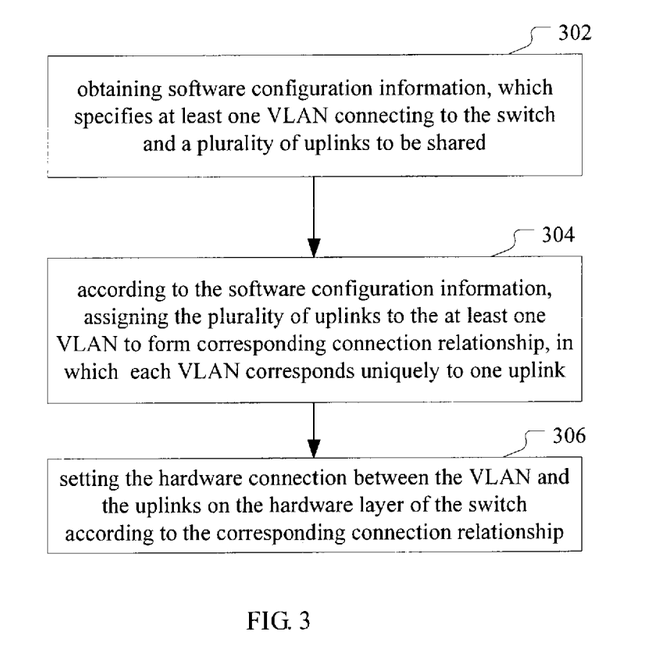
FIG. 3 shows a flow chart of a method according to an example.

FIG. 3 shows a flow chart of a method according to an example. As shown in FIG. 3, a method for managing a network connection of a switch according to one example comprises the following steps: first, in step 302, obtaining software configuration information relating to a network connection of the switch, wherein the software configuration information specifies at least one virtual local area network VLAN connecting to the switch and a plurality of uplinks to be shared by the at least one VLAN; then, in step 304, according to the software configuration information, assigning the plurality of uplinks to the at least one VLAN to form a corresponding connection relationship, in which relationship, each VLAN in the at least one VLAN corresponds uniquely to one uplink from the plurality of uplinks; and subsequently, in step 306, according to the corresponding connection relationship, setting the hardware connection between the at least one VLAN and the plurality of uplinks on the hardware layer of the switch. The detailed implementing mode of the above steps will be described below in conjunction with examples.

In particular, first, in step 302, the method obtains software configuration information relating to a network connection of the switch. As known by those skilled in the art, a switch has a software configuration layer for receiving users' configuration instructions and configuring a network connection of the switch according to the configuration instructions. Generally, users may specify, in the configuration instructions, which VLANs will be connected, which uplink ports of the switch will be used, and the like. As the uplink ports and the uplinks correspond to each other, therefore, according to the customs of those skilled in the art, in some context herein, "uplink" is used to indicate its corresponding uplink port.

In the case that users have configured a network connection of the switch, in step 302, the above mentioned software configuration information may be obtained by reading users' configuration instructions. Correspondingly, the software configuration information at least comprises, the configuration information of at least one VLAN connecting to the switch, and the configuration information of the uplinks that will be used. It can be understood that, in order to provide certain redundancy, in the description hereinafter, suppose the software configuration information specifies that a plurality of uplinks are shared for use. These uplinks may be different kinds of links having different kinds of ports, such as independent ports, trunks, or even mixed ports. The maximum number of the multiple uplinks is not limited. Typically, the software configuration information specifies that the at least one VLAN shares the plurality of uplinks. Thus, it can be deemed that the plurality of uplinks constitute shared links. Besides, in some examples, the software configuration information further comprises users' special settings on the shared links, such as preference setting, port setting, etc., which will be described in detail later.

After obtaining the software configuration information, in step 304, according to the software configuration information, the method assigns the plurality of uplinks in the shared links to each VLAN to form a corresponding connection relationship, such that each VLAN is uniquely assigned with one uplink. As will be described in detail later, the corresponding connection relationship is used to set the hardware layer of the switch. Therefore, in the corresponding connection relationship, it should be guaranteed that each VLAN is assigned with one uplink, thereby avoiding the occurrence of physical loops.

According to one example, the corresponding connection relationship is formed by using a way of random selection. In particular, for each VLAN, one uplink is randomly selected from the plurality of uplinks in the shared links and is assigned to the VLAN. Thus, each VLAN is uniquely assigned with one uplink.

According to another example, the corresponding connection relationship is formed by using a round-robin technique. In particular, suppose that the software configuration information specifies that m VLANs share n uplinks. Then, the m VLANs and the n uplinks may be lined up in a queue, respectively, and the n uplinks are successively assigned to the m VLANs one by one. Typically, the number m of VLANs is larger, or even far larger, than the number n of uplinks. In this case, after the n uplinks have been assigned to the first n VLANs in the queue correspondingly, the following process will be returning back to the first one of the queue of the uplinks, and continuing to assign the uplinks to the residual (m-n) VLANs, until each VLAN obtains one uplink. In this case, for VLANs, each VLAN uniquely obtains one uplink; while for the uplinks, it is possible that one uplink is assigned to multiple VLANs, and thus is shared by the multiple VLANs, or in other words, the uplink bears or carries multiple VLANs. In another case, the number n of the uplinks is larger than the number m of VLANs. In this case, only the first m uplinks in the queue are correspondingly assigned to the m VLANs, and the residual (n-m) uplinks have no necessity to be assigned. Now for VLANs, each VLAN still uniquely obtains one uplink, while for the uplinks, there are a part of the uplinks, such as the above residual (n-m) uplinks, which are not assigned to any VLAN, and are thus in idle state, also called "flying" mode.

In one example, the above corresponding connection relationship is formed by further considering the characteristics of the VLANs and the uplinks. For example, in one embodiment, the VLANs may be assigned with particular weights by considering the characteristics of the VLANs, such as the transmitted data type, the performance of the corresponding hosts, and so on. In this case, based on the above described round-robin method, the weighted round-robin method may be employed, thereby assigning the uplinks in the shared links by considering the weights of the VLANs. For example, a queue may be formed depending on the weights of the VLANs, and the VLANs with greater weights have the priority to be assigned with the uplinks. In another example, the uplinks may be assigned with particular weights by considering the characteristics of the uplinks, such as transmission rate, bandwidth, and so on. Similarly, the weighted round-robin method may be employed, thereby performing the assignment by considering the weights of the uplinks. For example, the uplinks with greater bandwidth may be assigned with greater weights, and the uplinks with greater weights may be allowed to carry more VLANs. In one example, the above two examples may be combined together, i.e., both the VLANs and the uplinks are assigned with weights, and the uplinks are assigned by employing the weighted round-robin method based on the assigned weights, thus forming the corresponding connection relationship.

In one example, at least a part of the weights of the VLANs and the weights of the uplinks may be determined by users, and thus are comprised in the software configuration information. Therefore, in step 304, the uplinks are assigned by considering at least a part of the weights of the VLANs and the weights of the uplinks comprised in the software configuration information, thus forming the corresponding connection relationship.

In one embodiment, the uplinks may be assigned by further considering special settings on the shared links in the software configuration information. In one example, the software configuration information comprises the users' preference setting, for example, what kinds of uplinks users prefer to carry more VLANs, which VLANs users prefer to be in the same group to share the same uplink, and so on, or even, users may directly specify the corresponding relationship between a part of, or even all of, the VLANs and the uplinks in the preference setting. Correspondingly, in step 304, the corresponding connection relationship is formed by considering the above preference setting, such that the formed corresponding connection relationship satisfies the users' preference setting.

In one example, the software configuration information comprises the users' setting on the ports, for example, a particular uplink port may be set as a reserved port, exclusively used for transmitting a particular type of data to the upstream network. In such a case, considering the above setting on the ports, the uplink ports, except the reserved port, are assigned to the VLAN to form the corresponding connection relationship, while the specified reserved port is set as flying mode. This is particularly applicable in the case that the number n of the uplinks is larger than the number m of the VLANs. In this case, users may set the spare uplink ports as reserved ports in the software configuration information. Of course, even in the case that the number n of the uplinks is smaller than or equal to the number m of the VLANs, users still may select some ports as reserved ports where necessary. Accordingly, in step 304, the corresponding connection relationship is formed according to the above setting on the ports, such that the formed corresponding connection relationship satisfies the users' setting on the ports.

Furthermore, users may set other items on the shared links in the software configuration information. Accordingly, in step 304, the corresponding connection relationship is formed according to the users' setting of other items in the software configuration information, such that the corresponding connection relationship satisfies the users' setting, and at the same time, it is guaranteed that each VLAN is assigned with one uplink.

On the basis of forming the corresponding connection relationship as described above, in step 306, according to the formed corresponding connection relationship, the method sets the hardware connection between the VLANs and the uplinks on the hardware layer. In particular, in the setting of the hardware layer, for each VLAN, the uplink which has been assigned to the VLAN in the corresponding connection relationship is added to the hardware connection of the VLAN. In one example, the hardware layer provides interface function APIs for operating registers relating to the connection setting on the hardware layer. By calling these APIs, it is possible to automatically set the hardware connection between the VLANs and the uplinks according to the corresponding connection relationship. In one example, it is also possible to manually set the hardware connection between the VLANs and the uplinks on the hardware layer according to the corresponding connection relationship. Since in the corresponding connection relationship each VLAN is uniquely assigned with one uplink, after the setting of hardware layer in step 306, each VLAN has only one active physical link. Thus, the formation of physical loops is avoided without the need to execute the Spanning Tree Protocol (STP), thereby simplifying the network connection.

Figure 4A:
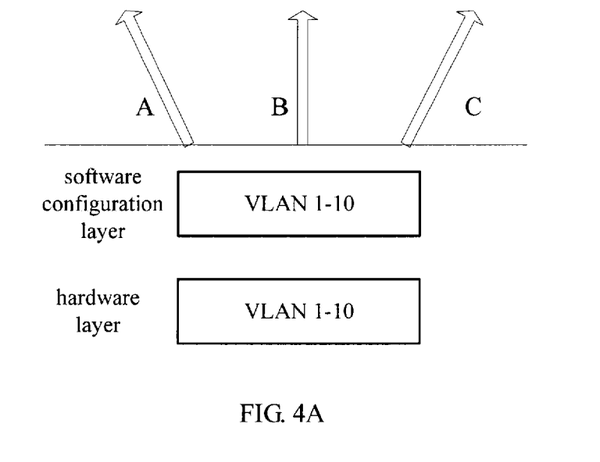
FIGS. 4A and 4B are schematic diagrams of shared links formed according to the prior art and to an example of the invention, respectively.
Figure 4B:
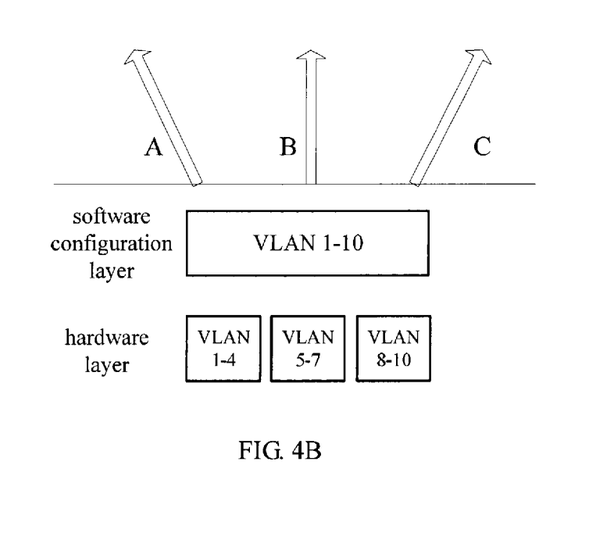

FIGS. 4A and 4B are schematic diagrams of shared links formed according to the prior art and to an embodiment of the invention, respectively. In the examples of FIGS. 4A and 4B, in the software configuration layer of the switch, users set the software configuration information, such that the 10 VLANs (labeled as VLAN1 to VLAN10, respectively) connecting to the switch share the shared links consisting of 3 uplinks A, B and C.

FIG. 4A shows the shared links formed in the prior art. In the prior art, the configuration of the hardware layer is conducted entirely depending on the configuration information in the software configuration layer. That is, in the hardware layer, the connection relationship is likely set as that 10 VLANs share 3 uplinks. Thus, in the case of enabling 3 uplinks simultaneously, it is prone to cause some problems like physical loops, etc.

FIG. 4B shows the shared links formed according to one embodiment of the invention. As shown in FIG. 4B, when the method shown in FIG. 3 is executed, it assigns the 3 uplinks to the 10 VLANs to form the corresponding connection relationship, wherein each VLAN obtains only one uplink, and then sets the connection between the VLANs and the uplinks on the hardware layer of the switch according to the corresponding connection relationship. In particular, in the example of FIG. 4B, in the formed corresponding connection relationship, uplink A is assigned to VLANs 1-4, uplink B is assigned to VLANs 5-7, and uplink C is assigned to VLANs 8-10. Thus, each VLAN obtains one uplink as the active link. It can be seen that, according to the method of the examples of the invention, the corresponding connection relationship is formed by performing further assignment based on the software configuration information, and it satisfies the sharing relationship specified in the software configuration information, but is not exactly the same. That is, according to the method of FIG. 3, the connection relationship between the VLANs and the uplinks has different settings on the software configuration layer and hardware layer of the switch. On the hardware layer, each VLAN has only one active uplink, while on the software configuration layer, it is still possible to obtain the configuration result that multiple VLANs share multiple uplinks. Thus, the method provides multiple active uplinks when avoiding physical loops.

Another advantage of having different configurations on the software configuration layer and on the hardware layer is that, it is possible to dynamically and flexibly adjust the corresponding connection relationship between the VLANs and the uplinks based on the runtime status without the need of making configuration again on the software configuration layer. Correspondingly, according to one embodiment, the method of the invention further comprises, in response to the change of the runtime status of the switch, updating the corresponding connection relationship between the VLANs and the uplinks.

In particular, in one example, the change of the runtime status comprises the change of the uplink load. It can be understood that, during the operating process of the data center, the running status and the data transfer status of the hosts comprised in the VLANs often change, such that the loads of the uplinks carrying these VLANs often change. According to one example, when the loads of the uplinks change, the above corresponding connection relationship is updated by transferring some VLANs, thereby balancing the loads of the uplinks. For example, in response to the increase of loads of particular uplinks, for example, the increase of loads to a first load threshold, at least a part of the VLANs are transferred, from the particular uplinks with loads higher than the first load threshold, to the uplinks except the particular uplinks. Alternatively, in response to the decrease of loads of some uplinks, for example, the decrease to a second load threshold, at least a part of the VLANs may also be transferred from other uplinks to the uplinks with loads lower than the second load threshold. The above first load threshold and second load threshold may be predetermined, representing the cases of uplinks bearing higher loads and lower loads, respectively. Through the above method, the corresponding connection relationship is dynamically updated to balance the loads of the uplinks.

According to one embodiment, the change of runtime status comprises an uplink failure. It can be understood that one purpose of providing a switched network with redundant uplinks is to ensure the usability of the network using the redundant uplinks in the case of a failure of the active uplinks. Therefore, the response and treatment to the failure of uplinks directly affect the stability of the network. According to examples of the invention, in the case of an uplink failure, the usability of the network is ensured by updating the corresponding connection relationship between the VLANs and the uplinks so as to transfer the VLANs affected by the failed uplink. In particular, in response to a failure of an uplink, the VLANs carried by the failed uplink are transferred to other uplinks in normally active status in the corresponding connection relationship. In one particular example, a target link is determined from other links, and thus the VLANs carried by the failed uplink are transferred to the target link. The target link may be an uplink selected randomly from said other uplinks in normally active status. More particularly, from the other uplinks in normally active status, the uplinks with relatively large bandwidth (for example, larger than a first bandwidth threshold), or the uplinks with relatively small current loads (for example, smaller than a lower load threshold, which threshold may be equal to the second load threshold as described above, or may be another predetermined relatively low threshold) may be selected as the target links. The target links may also be determined based on other factors. In another example, the VLANs assigned with the failed uplink are randomly or equally transferred to other uplinks, thereby realizing rapid handover of uplinks. Thus, by updating the corresponding connection relationship between the VLANs and the uplinks, the VLANs that might be affected by the failure are transferred, such that the VLAN data are smoothly transmitted to the upstream network.

Contrary to the failure of uplinks, the change of runtime status further comprises a recovery of the uplink failure. Accordingly, in response to the recovery of the uplink failure, VLANs are assigned to the recovered uplinks. In one embodiment, by updating the corresponding connection relationship between the VLANs and the uplinks, at least a part of the VLANs carried by other uplinks are transferred to a recovered uplink, and thus the recovered uplink is assigned with VLANs. In particular, in one example, at least one source link is determined among other uplinks, and then at least a part of the VLANs carried by the source link is transferred to the recovered uplink. The source link may be an uplink selected randomly from other uplinks. More particularly, from other uplinks, the uplink with relatively small bandwidth (for example, smaller than a second bandwidth threshold), or the uplink with relatively large current load (for example, larger than an upper load threshold, which threshold may be equal to the first load threshold as described above, or may be another predetermined relatively large threshold) may be selected as the source link. The source link may also be determined based on other factors. This is similar to the consideration when balancing loads. In another example, at least a part of the VLANs carried by other uplinks are randomly or equally transferred to the recovered uplink, thus reusing the recovered uplink.

In another example, new corresponding connection relationship is formed based on the recovered uplinks, thereby assigning the recovered uplinks with VLANs. In particular, in response to the recovery of the uplink failure, the process may clear the original corresponding connection relationship between the VLANs and the uplinks, and re-assign the recovered uplinks and other uplinks to the VLANs, thus forming the new corresponding connection relationship. This is similar to the case of performing step 304 of FIG. 3 for a second time, and therefore the detailed assigning process is not described any more.

It can be understood that, in the case of a failure of uplinks, it is desired to immediately transfer the VLANs carried by the failed uplinks to keep the usability of the network. However, when the failure of uplinks is recovered, the operation of assigning the recovered uplinks with the VLANs is not necessarily executed immediately, and instead, it may be executed when appropriate to keep the stability of the network. In one embodiment, in response to obtaining the notification of the recovery of the failed uplinks, according to a predetermined timing, the recovered uplink is assigned with the VLANs. According to one example, the above mentioned predetermined timing is realized by using a timer. In particular, once the notification of the recovery of the failure is received, a preset timer is enabled, and the status of the recovered uplinks is monitored continuously. When the time of the timer has passed and the recovered uplinks have continuously been in normally available status, the updating or re-forming of the corresponding connection relationship is executed, thereby assigning the recovered uplinks with the VLANs. This may avoid frequent handovers due to the instability of the recovered uplinks. In another example, the above mentioned predetermined timing is a particular moment specified by users. For example, users may specify that, on the next zero o'clock after the recovery of the failure, the assigning operation of the VLANs is executed. In another example, the above mentioned predetermined timing is determined by a predetermined condition. For example, the predetermined condition may be the case that the total data transmission rate in the shared links is smaller than a threshold, i.e., the business data transmission is at low valley. Updating or re-forming the corresponding connection relationship between the VLANs and the uplinks under such conditions may reduce the influence on the business data being transmitted.

It can be understood that, during the process of the failure and the recovery of the uplinks as described above, what is needed is only to update or re-form the corresponding connection relationship between the VLANs and the uplinks, that is, only to update the setting on the hardware layer, without the need for users to re-configure on the software configuration layer. This allows the formed shared links to be able to be dynamically and flexibly adapted to different runtime status.

On the other hand, during the operating process of the data center, users may modify the software configuration information when necessary, such as adding or removing uplinks, adding or removing VLANs, and so on. In one embodiment, no matter how users modify the software configuration information, the modified software configuration information may be considered as new software configuration information, based on which the corresponding connection relationship is re-formed, that is to re-execute steps 302-306 of FIG. 3. There is no need to describe this process repeatedly. In another embodiment, in response to the change of the software configuration information, the corresponding connection relationship is updated to satisfy the changed software configuration information. In this embodiment, the content in the original corresponding connection relationship is preserved as much as possible, thus reducing the influence on the running data center network.

In particular, in one example, the change of the software configuration information comprises adding uplinks, that is, users want to enable new uplinks. In this case, the treatment may be similar to the case where the failed uplinks are recovered. That is, in response to obtaining the notification of adding uplinks, according to a predetermined timing, the corresponding connection relationship is updated to assign the added uplinks with the VLANs. The above mentioned predetermined timing may be realized by using a timer, or may be determined by the moment or condition specified by users. In order to assign the newly added uplinks with the VLANs, in the corresponding connection relationship, a part of the VLANs carried by the existing uplinks are transferred to the added uplinks. The above mentioned part of the VLANs may be selected by many ways, for example, they may be selected from VLANs carried by the uplinks with relatively small bandwidth among the existing uplinks, or by the uplinks with relatively large current loads, and so on. The factors to be considered are similar to those in the case that the failed uplinks are recovered.

In one example, the change of the software configuration information comprises removing uplinks. In this case, the treatment may be similar to that in the case of a failure of uplinks. That is, in response to the instruction of removing uplinks, the corresponding connection relationship is updated, such that the VLANs carried by the removed uplinks are transferred to other uplinks in normally active status. For the detailed process, reference can be made to the transferring process of VLANs in the case of a failure of uplinks.

In one example, the change of the software configuration information comprises adding a VLAN, that is, users want to enable a new VLAN. In response to such a change, the newly added VLAN is assigned with an uplink. The uplink may be one selected randomly from all the uplinks in active status, and more particularly, it may be an uplink with relatively small load or relatively large bandwidth.

In one example, the change of the software configuration information comprises removing a VLAN, that is, users instruct that a VLAN is not needed any more. For this case, in one embodiment, the corresponding relationship between the removed VLAN and its uplink is deleted from the corresponding connection relationship.

For other changes of the software configuration information, such as the change of preference setting, the change of port setting, etc., the corresponding connection relationship may also be updated accordingly so as to satisfy the changed software configuration information.

It can be understood that, according to the method of the examples of the invention, the connection between the VLANs and the uplinks is configured on the hardware layer of the switch according to the formed corresponding connection relationship. This not only provides multiple uplinks in active status without loops, but also allows the network connection relating to the uplinks to be configured more flexibly. In the case that the runtime status of the switch changes, it is possible to dynamically adjust the corresponding connection relationship between the VLANs and the uplinks without the need of making re-configuration on the software configuration layer. In the case that the software configuration information changes, it is also possible to update the corresponding connection relationship to be adapted to the change of the software configuration information.

Figure 5:
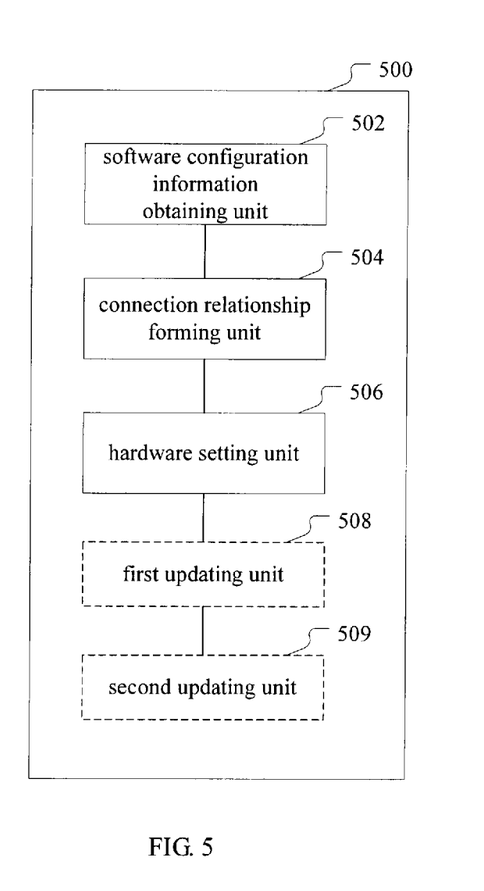
FIG. 5 is a schematic block diagram showing an apparatus according to an example of an aspect of the invention.

Embodiments of the present invention further provide an apparatus for managing a network connection of a switch. FIG. 5 is a schematic block diagram showing an apparatus for managing a network connection of a switch according to an embodiment of the invention. In FIG. 5, the apparatus is generally labeled as 500. As shown in the figure, the apparatus 500 for managing a network connection of a switch comprises: a software configuration information obtaining unit 502, configured to obtain software configuration information relating to a network connection of the switch, wherein the software configuration information specifies at least one virtual local area network VLAN connecting to the switch and a plurality of uplinks to be shared by the at least one VLAN; a connection relationship forming unit 504, configured to assign, according to the software configuration information, the plurality of uplinks to the at least one VLAN to form a corresponding connection relationship, in which relationship, each VLAN in the at least one VLAN corresponds uniquely to one uplink from the plurality of uplinks; and a hardware setting unit 506, configured to set the hardware connection between the at least one VLAN and the plurality of uplinks on the hardware layer of the switch according to the corresponding connection relationship.

According to one example, the above connection relationship forming unit 504 is configured to use the round-robin method to form the corresponding connection relationship.

According to one example, the above connection relationship forming unit 504 is configured to assign the plurality of the uplinks by considering at least a part of the weights of the at least one VLAN and the weights of the plurality of the uplinks.

According to one example, the apparatus 500 further comprises a first updating unit 508 (shown in dashed lines), configured to update, in response to a change of the runtime status of the switch, the corresponding connection relationship.

In one example, the change of the runtime status comprises a change of the uplink load. Correspondingly, the first updating unit 508 is configured to execute at least one of the following: transferring at least a first part of VLANs from particular uplinks with loads larger than a first load threshold to uplinks except the particular uplinks, and transferring at least a second part of VLANs from other uplinks to the uplinks with loads smaller than a second load threshold.

In one example, the change of the runtime status comprises an uplink failure; accordingly, the first updating unit 508 is configured to transfer the VLANs carried by a failed uplink to other uplinks in normally active status. According to one example, the above first updating unit 508 is further configured to: select a target link from said other uplinks, wherein the target link satisfies at least one of the following conditions: its bandwidth is larger than a first bandwidth threshold, and its current load is smaller than a lower load threshold; and transfer the VLANs carried by the failed uplink to the target link.

In one example, the change of the runtime status comprises a recovery of uplink failure; accordingly, the first updating unit 508 is configured to transfer at least a part of the VLANs carried by other uplinks to a recovered uplink according to a predetermined timing.

According to one example, the predetermined timing is determined by one of the following ways: a predetermined timer, a specified moment, and a predetermined condition.

According to one example, the first updating unit 508 is further configured to: determine a source link from said other uplinks, wherein the source link satisfies at least one of the following conditions: its bandwidth is smaller than a second bandwidth threshold, and its current load is larger than an upper load threshold; and transfer at least a part of the VLANs carried by the source uplink to the recovered uplink.

According to one example, the apparatus 500 further comprises a second updating unit 509 (shown in dashed lines), configured to update, in response to a change of the software configuration information, the corresponding connection relationship to satisfy the changed software configuration information.

The detailed implementing modes of the above apparatus 500 for managing a network connection of a switch will not be described in detail, and reference can be made to the description on the method in conjunction with particular examples.

In one example, the above apparatus 500 is contained in a switch, and lies between the conventional software configuration layer and the hardware layer of the switch. In another example, the above apparatus 500 may also serve as an independent tool, communicating with the switch, and thus realizing the management of the network connection of the switch.

By aspects of the invention, shared links may be formed in the switch, which links have a plurality of uplinks, with redundancy and all in active status. Furthermore, the formed shared links may be flexibly adapted to the change of the runtime state (status) and the change of configuration, improving the usability of the network and improving the network availability.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing a network connection of a switch, comprising:
   obtaining software configuration information relating to the network connection of the switch, wherein the software configuration information specifies at least one virtual local area network (VLAN) connecting to the switch and a plurality of uplinks to be shared by the at least one VLAN;
   assigning weights to each VLAN of the at least one VLAN based on one or more of user input contained in the software configuration information and one or more characteristics of each of the at least one VLAN, the one or more characteristics of each VLAN comprising one or more of a transmitted data type and a performance of one or more corresponding host devices;
   placing each VLAN of the at least one VLAN in a queue according to the weights assigned to each of the at least one VLAN;
   assigning weights to each of the plurality of uplinks based on one or more of user input contained in the software configuration information and one or more characteristics of each uplink, the one or more characteristics of each uplink comprising one or more of a transmission rate, a bandwidth, and a load capacity;
   according to the software configuration information, the weights assigned to the at least one VLAN, and the weights assigned to each of the plurality of uplinks, assigning the plurality of uplinks to the at least one VLAN by:
      selecting the at least one VLAN from the queue; and
      selecting an uplink for the selected at least one VLAN using a weighted method to form a corresponding connection relationship between the selected at least one VLAN and the selected uplink,
   wherein each VLAN in the at least one VLAN corresponds uniquely to one uplink from the plurality of uplinks; and
   setting a hardware connection between the at least one VLAN and the plurality of uplinks on a hardware layer of the switch according to the corresponding connection relationship.

2. The method according to claim 1, further comprising updating the corresponding connection relationship in response to a change of runtime status of the switch.

3. The method according to claim 2, wherein the change of the runtime status comprises a change of uplink load, and updating the corresponding connection relationship comprises at least one of the following: transferring at least a first part of VLANs from particular uplinks with loads larger than a first load threshold to uplinks except the particular uplinks, or transferring at least a second part of VLANs from other uplinks to the uplinks with loads smaller than a second load threshold.

4. The method according to claim 2, wherein the change of the runtime status comprises an uplink failure, and updating the corresponding connection relationship comprises transferring the VLANs carried by a failed uplink to other uplinks in normally active status.

5. The method according to claim 4, wherein transferring the VLANs carried by a failed uplink to other uplinks in normally active status comprises: selecting a target link from said other uplinks, wherein the target link satisfies at least one of the following conditions: its bandwidth is larger than a first bandwidth threshold, or its current load is smaller than a lower load threshold; and transferring the VLANs carried by the failed uplink to the target link.

6. The method according to claim 2, wherein the change of the runtime status comprises a recovery of uplink failure, and updating the corresponding connection relationship comprises transferring at least a part of the VLANs carried by other uplinks to a recovered uplink according to a predetermined timing, wherein the predetermined timing is determined by one of the following: a predetermined timer, a specified moment, or a predetermined condition.

7. The method according to claim 6, wherein transferring at least a part of the VLANs carried by other uplinks to a recovered uplink comprises: determining a source uplink from said other uplinks, wherein the source uplink satisfies at least one of the following conditions: its bandwidth is smaller than a second bandwidth threshold, and its current load is larger than an upper load threshold; and transferring at least a part of the VLANs carried by the source uplink to the recovered uplink.

8. The method according to claim 1, further comprising, in response to a change of the software configuration information, updating the corresponding connection relationship to satisfy the changed software configuration information.

9. An apparatus for managing a network connection of a switch, comprising:
   a processor;
   a software configuration information obtaining unit configured to obtain software configuration information, by the processor, relating to the network connection of the switch, wherein the software configuration information specifies at least one virtual local area network (VLAN) connecting to the switch and a plurality of uplinks to be shared by the at least one VLAN;
   a connection relationship forming unit configured to:
      assign, by the processor, weights to each of the at least one VLAN based on one or more of user input contained in the software configuration information and one or more characteristics of each of the at least one VLAN, the one or more characteristics of each VLAN comprising one or more of a transmitted data type and a performance of one or more corresponding host devices; and
      assign, by the processor, weights to each of the plurality of uplinks based on one or more of user input contained in the software configuration information and one or more characteristics of each of the plurality of uplinks, the one or more characteristics of each uplink comprising one or more of a transmission rate, a bandwidth, and a load capacity; and
      assign, by the processor, according to the software configuration information, the weights assigned to the at least one VLAN, and the weights assigned to each of the plurality of uplinks, the plurality of uplinks to the at least one VLAN by:
selecting the at least one VLAN; and
selecting an uplink for the selected at least one VLAN using a weighted method to form a corresponding connection relationship between the selected at least one VLAN and the selected uplink,
wherein each VLAN in the at least one VLAN corresponds uniquely to one uplink from the plurality of uplinks; and
a hardware setting unit configured to set a hardware connection, by the processor, between the at least one VLAN and the plurality of uplinks on a hardware layer of the switch according to the corresponding connection relationship.

10. The apparatus according to claim 9, further comprising a first updating unit configured to update, by the processor, the corresponding connection relationship in response to a change of the runtime status of the switch.

11. The apparatus according to claim 10, wherein the change of the runtime status comprises a change of uplink load, and the first updating unit is configured to execute at least one of the following: transferring at least a first part of VLANs from particular uplinks with loads larger than a first load threshold to uplinks except the particular uplinks, or transferring at least a second part of VLANs from other uplinks to the uplinks with loads smaller than a second load threshold.

12. The apparatus according to claim 10, wherein the change of the runtime status comprises a recovery of uplink failure, and the first updating unit is configured to transfer at least a part of the VLANs carried by other uplinks to a recovered uplink according to a predetermined timing, wherein the predetermined timing is determined by one of the following: a predetermined timer, a specified moment, or a predetermined condition.

13. The apparatus according to claim 9, further comprising a second updating unit configured to, in response to a change of the software configuration information, update, by the processor, the corresponding connection relationship to satisfy the changed software configuration information.

14. A computer program product of managing a network connection of a switch, comprising:
a non-transitory computer readable storage medium readable by a processing circuit and storing instructions for execution by the processing circuit for performing a method comprising:
obtaining software configuration information relating to the network connection of the switch, wherein the software configuration information specifies at least one virtual local area network (VLAN) connecting to the switch and a plurality of uplinks to be shared by the at least one VLAN;
assigning weights to each VLAN of the at least one VLAN based on one or more of user input contained in the software configuration information and one or more characteristics of each of the at least one VLAN, the one or more characteristics of each VLAN comprising one or more of a transmitted data type and a performance of one or more corresponding host devices;
placing each VLAN of the at least one VLAN in a queue according to the weights assigned to each of the at least one VLAN;
assigning weights to each of the plurality of uplinks based on one or more of user input contained in the software configuration information and one or more characteristics of each uplink, the one or more characteristics of each uplink comprising one or more of a transmission rate, a bandwidth, and a load capacity;
according to the software configuration information, the weights assigned to the at least one VLAN, and the weights assigned to each of the plurality of uplinks, assigning the plurality of uplinks to the at least one by:
selecting the at least one VLAN from the queue; and
selecting an uplink for the selected at least one VLAN using a weighted method to form a corresponding connection relationship between the selected at least one VLAN and the selected uplink,
wherein each VLAN in the at least one VLAN corresponds uniquely to one uplink from the plurality of uplinks; and
setting a hardware connection between the at least one VLAN and the plurality of uplinks on a hardware layer of the switch according to the corresponding connection relationship.

15. The computer program product according to claim 14, wherein the method further comprises updating the corresponding connection relationship in response to a change of runtime status of the switch.

16. The computer program product according to claim 15, wherein the change of the runtime status comprises a change of uplink load, and updating the corresponding connection relationship comprises at least one of the following: transferring at least a first part of VLANs from particular uplinks with loads larger than a first load threshold to uplinks except the particular uplinks, or transferring at least a second part of VLANs from other uplinks to the uplinks with loads smaller than a second load threshold.

17. The computer program product according to claim 15, wherein the change of the runtime status comprises a recovery of uplink failure, and updating the corresponding connection relationship comprises transferring at least a part of the VLANs carried by other uplinks to a recovered uplink according to a predetermined timing, wherein the predetermined timing is determined by one of the following: a predetermined timer, a specified moment, or a predetermined condition.

18. The computer program product according to claim 14, wherein the method further comprises: in response to a change of the software configuration information, updating the corresponding connection relationship to satisfy the changed software configuration information.

* * * * *